United States Patent
Ritts (12) 
(10) Patent No.: US 12,491,971 B1
(45) Date of Patent: Dec. 9, 2025

(54) ENHANCED BOAT ANCHOR LIGHT

(71) Applicant: Edwin Ritts, Lyman, SC (US)

(72) Inventor: Edwin Ritts, Lyman, SC (US)

(*) Notice: Subject to any disclaimer, the term of this patent is extended or adjusted under 35 U.S.C. 154(b) by 0 days.

(21) Appl. No.: 18/903,030

(22) Filed: Oct. 1, 2024

(51) Int. Cl.
| | |
|---|---|
| *B63B 45/04* | (2006.01) |
| *F21S 4/26* | (2016.01) |
| *F21S 8/00* | (2006.01) |
| *F21V 23/00* | (2015.01) |
| *F21W 107/20* | (2018.01) |
| *F21Y 115/10* | (2016.01) |

(52) U.S. Cl.
CPC .............. *B63B 45/04* (2013.01); *F21S 4/26* (2016.01); *F21S 8/032* (2013.01); *F21V 23/003* (2013.01); *F21W 2107/20* (2018.01); *F21Y 2115/10* (2016.08)

(58) Field of Classification Search
CPC .. B63B 45/04; F21S 4/26; F21S 8/032; F21V 23/003; F21Y 2115/10; F21W 2107/20
See application file for complete search history.

(56) References Cited

U.S. PATENT DOCUMENTS

| | | | |
|---|---|---|---|
| 6,174,078 B1* | 1/2001 | Ohm | B63B 45/06 362/228 |
| 6,848,815 B1* | 2/2005 | Born | B63B 45/04 362/477 |
| 7,758,219 B2 | 7/2010 | Burke | |
| 7,946,741 B2* | 5/2011 | Nichols | B60Q 1/2657 362/477 |
| D700,383 S | 2/2014 | Seidl | |
| 9,533,742 B2 | 1/2017 | Deven | |
| 10,472,028 B2 | 11/2019 | Ardoin | |
| 11,305,850 B1* | 4/2022 | Vydrzal | B63B 45/04 |
| 11,554,837 B2 | 1/2023 | Popa | |
| 2018/0334232 A1 | 11/2018 | Poole | |

FOREIGN PATENT DOCUMENTS

WO 2021041925 3/2021

* cited by examiner

*Primary Examiner* — Bao Q Truong (57) ABSTRACT

The enhanced boat anchor light is a signaling device. The enhanced boat anchor light is a safety device. The enhanced boat anchor light is configured for use with a vessel. The enhanced boat anchor light is illuminated during darkness such that the vessel can be seen on the water. The enhanced boat anchor light signals into the environment that the boat is at anchor. The enhanced boat anchor light incorporates a stanchion structure and a lamp circuit. The lamp circuit mounts on the stanchion structure. The lamp circuit generates the illumination of the enhanced boat anchor light. The stanchion structure elevates the generated illumination above the surface of the water.

15 Claims, 5 Drawing Sheets

ENHANCED BOAT ANCHOR LIGHT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The enhanced boat anchor light is a signaling device. The enhanced boat anchor light is a safety device. The enhanced boat anchor light is configured for use with a vessel. The enhanced boat anchor light is illuminated during darkness such that the vessel can be seen on the water. The enhanced boat anchor light signals into the environment that the boat is at anchor. The enhanced boat anchor light comprises a stanchion structure and a lamp circuit. The lamp circuit mounts on the stanchion structure. The lamp circuit generates the illumination of the enhanced boat anchor light. The stanchion structure elevates the generated illumination above the surface of the water.

These together with additional objects, features and advantages of the enhanced boat anchor light will be readily apparent to those of ordinary skill in the art upon reading the following detailed description of the presently preferred, but nonetheless illustrative, embodiments when taken in conjunction with the accompanying drawings.

In this respect, before explaining the current embodiments of the enhanced boat anchor light in detail, it is to be understood that the enhanced boat anchor light is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the enhanced boat anchor light.

It is therefore important that the claims be regarded as including such equivalent construction insofar as they do not depart from the spirit and scope of the enhanced boat anchor light. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
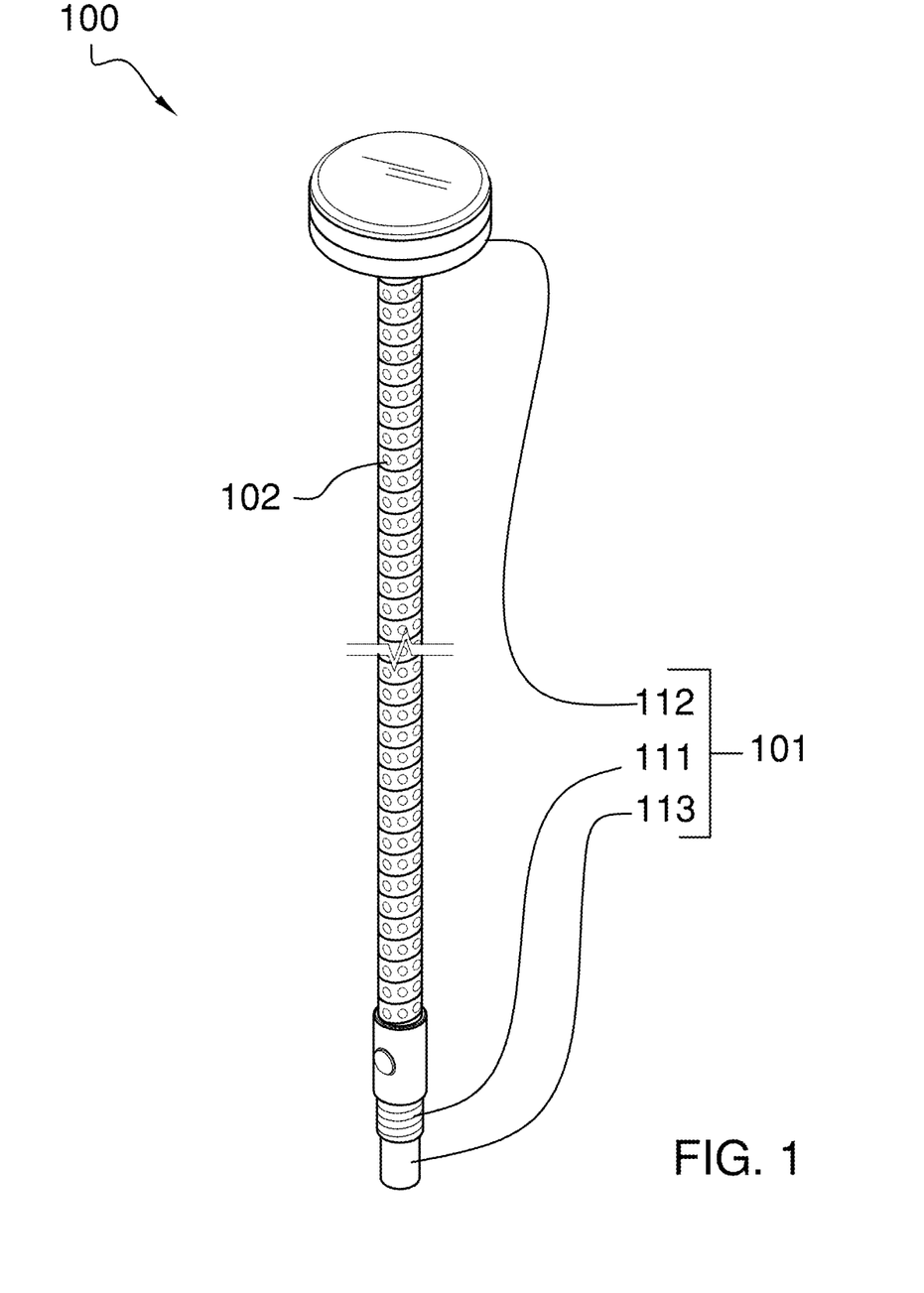
FIG. 1 is a perspective view of an embodiment of the disclosure.
Figure 2:
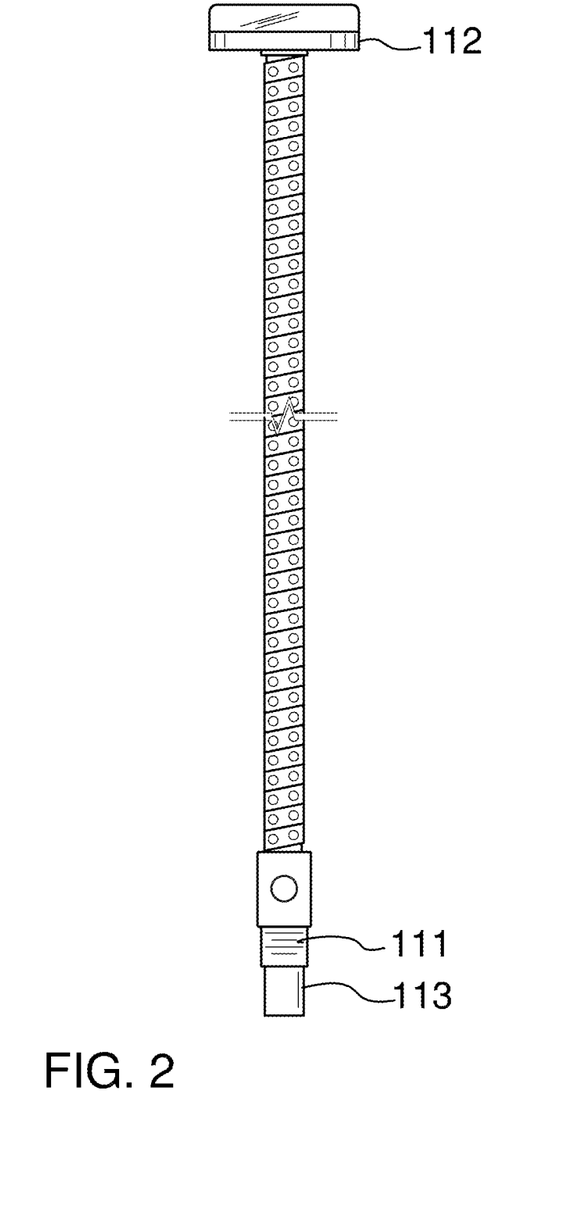
FIG. 2 is a front view of an embodiment of the disclosure.
Figure 3:
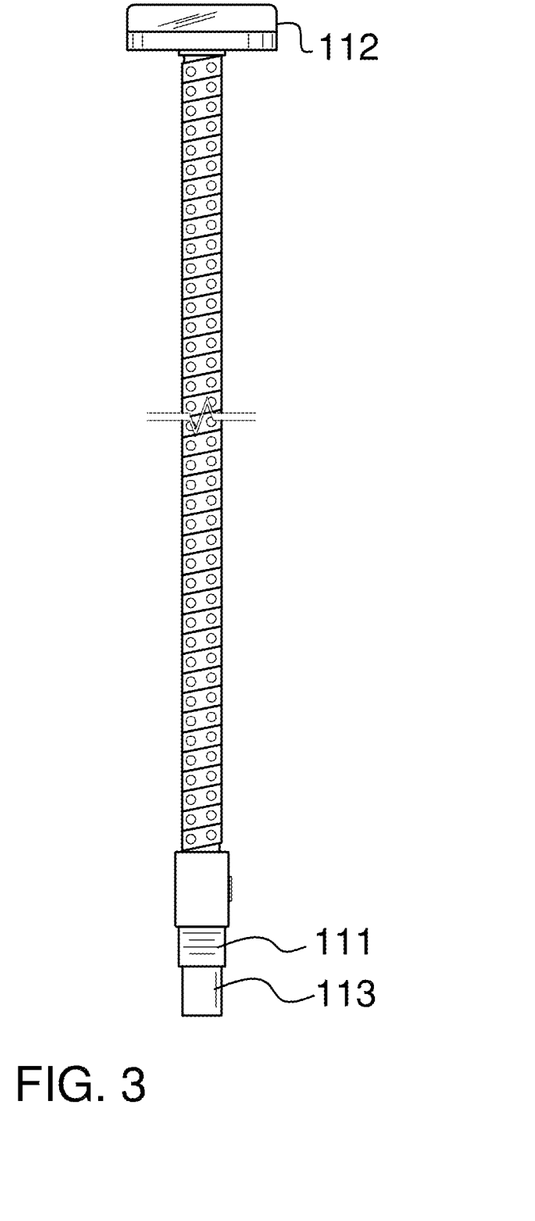
FIG. 3 is a side view of an embodiment of the disclosure.
Figures 4, 5:
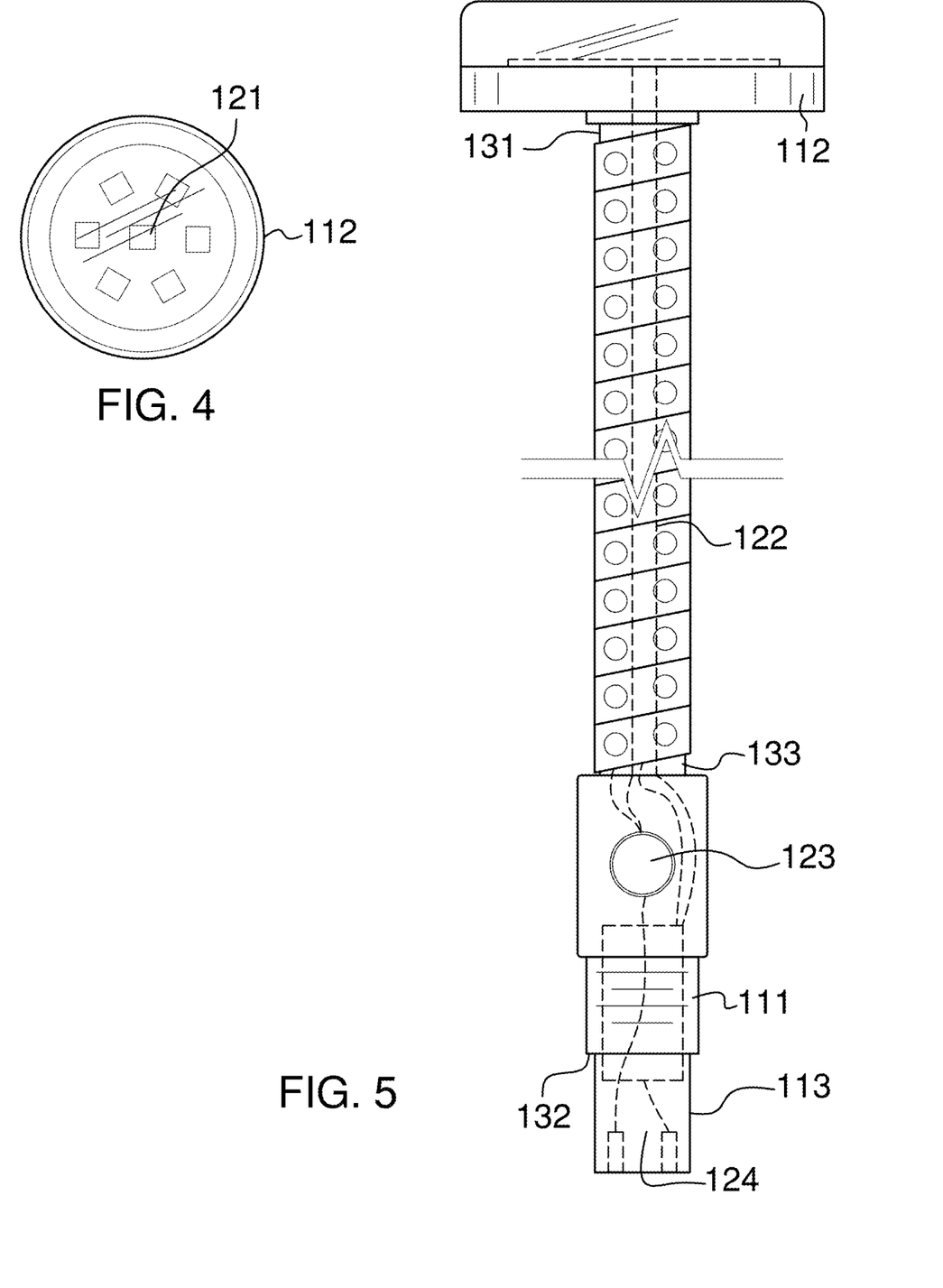
FIG. 4 is a top view of an embodiment of the disclosure.
FIG. 5 is a detail view of an embodiment of the disclosure.
Figure 6:
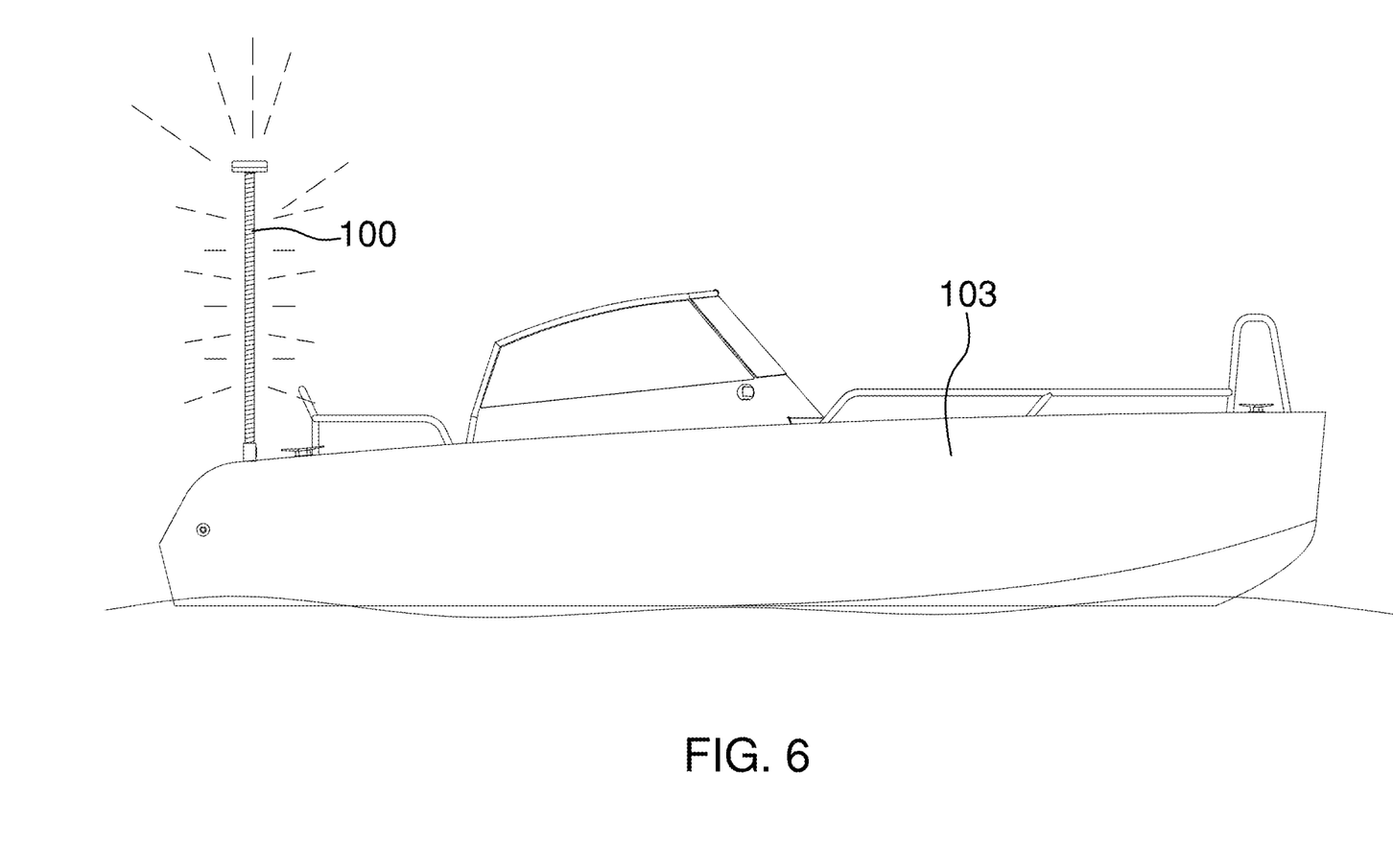
FIG. 6 is an in-use view of an embodiment of the disclosure.
Figure 7:
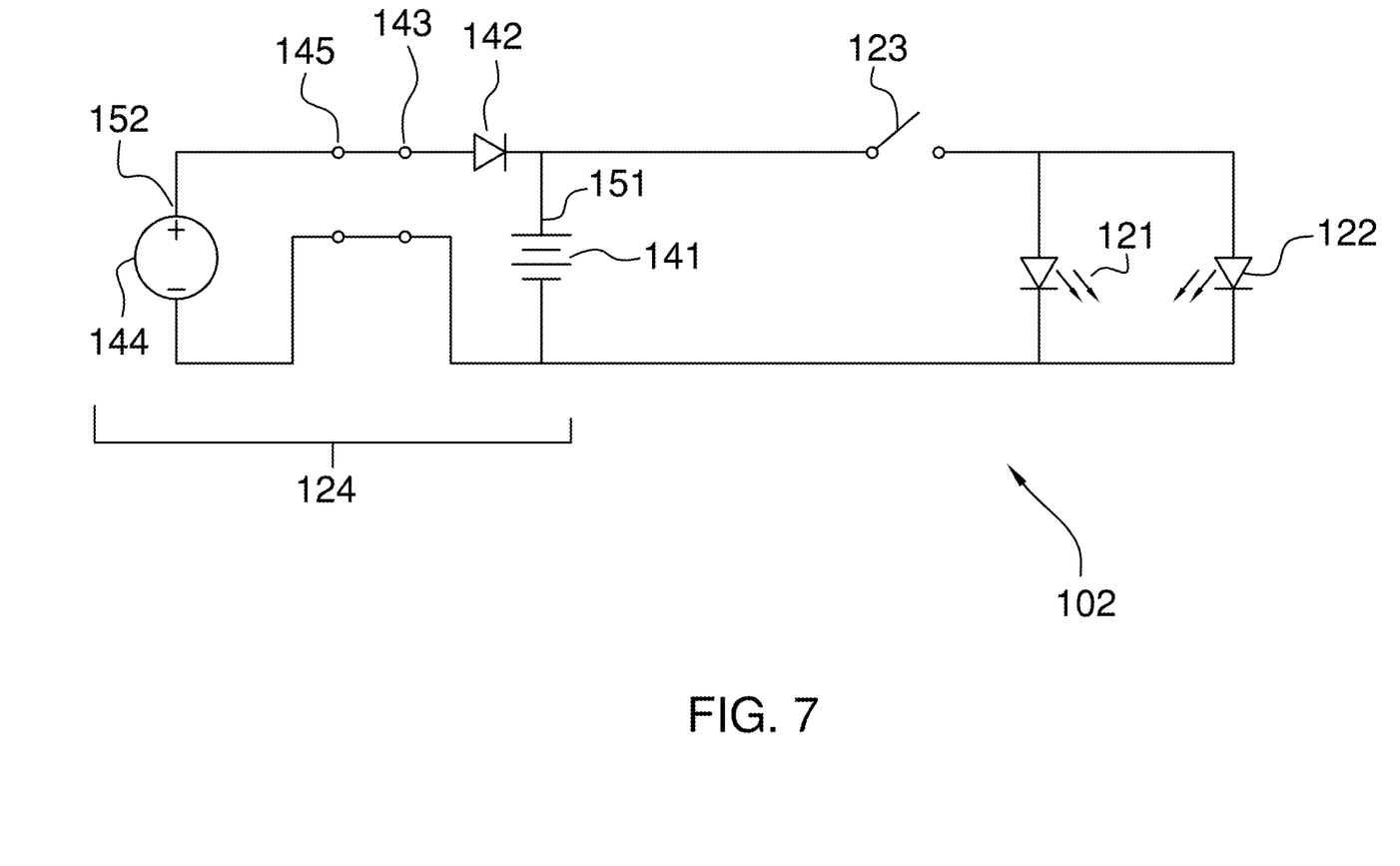
FIG. 7 is a schematic view of an embodiment of the disclosure.

Detailed reference will now be made to one or more potential embodiments of the disclosure, which are illustrated in FIGS. 1 through 7.

The enhanced boat anchor light 100 (hereinafter invention) is a signaling device. The invention 100 is a safety device. The invention 100 is configured for use with a vessel 103. The invention 100 is illuminated during darkness such that the vessel 103 can be seen on the water. The invention 100 signals into the environment that the boat is at anchor. The invention 100 comprises a stanchion structure 101 and a lamp circuit 102. The lamp circuit 102 mounts on the stanchion structure 101. The lamp circuit 102 generates the illumination of the invention 100. The stanchion structure 101 elevates the generated illumination above the surface of the water.

The vessel 103 is a vehicle. The vessel 103 allows for the transport of passengers and cargo over water. The vessel 103 further comprises an electrical system that can be used as a source of electric energy.

The stanchion structure 101 is a rigid structure. The stanchion structure 101 is a load bearing structure. The stanchion structure 101 is a prism shaped structure. The stanchion structure 101 attaches to the vessel 103 such that the center axis of the stanchion structure 101 is vertically aligned. The stanchion structure 101 transfers the load of the lamp circuit 102 to the vessel 103. The lamp circuit 102 mounts on the stanchion structure 101 such that the illumination generated by the lamp circuit 102 is visible from the environment. The stanchion structure 101 elevates the lamp circuit 102 above the surface of the water. The stanchion structure 101 comprises a post structure 111, a dome disk 112, and a vessel 103 mount 113.

The post structure 111 forms the primary structure of the stanchion structure 101. The post structure 111 forms the primary shape of the stanchion structure 101. The post structure 111 is a rigid structure. The post structure 111 is a prism shaped structure. The post structure 111 is a load bearing structure. A portion of the lamp circuit 102 attaches to the exterior surface of the post structure 111. The post structure 111 transfers the loads of the lamp circuit 102, the dome disk 112, and the vessel 103 mount 113 to the vessel 103. The post structure 111 elevates the lamp circuit 102 and the dome disk 112 above the surface of the water. The post structure 111 further comprises a first congruent end 131, a second congruent end 132, and a lateral face structure 133.

The first congruent end 131 is a congruent end of the prism structure of the post structure 111. The first congruent end 131 is the superior structure of the post structure 111. The first congruent end 131 is the congruent end of the post structure 111 that is distal from the surface of the water. The second congruent end 132 is a congruent end of the prism structure of the post structure 111. The second congruent end 132 is the inferior structure of the post structure 111. The second congruent end 132 is the congruent end of the post structure 111 that is distal from the first congruent end 131. The lateral face structure 133 forms the lateral face of the prism structure of the post structure 111.

The dome disk 112 is a disk shaped structure. The dome disk 112 is a partially transparent structure. The dome disk 112 is a hollow structure. The dome disk 112 attaches to the first congruent end 131 of the post structure 111 to form a congruent prism structure. The dome disk 112 forms a housing that contains the balance of the lamp circuit 102.

The vessel 103 mount 113 is a roughly tubular structure. The vessel 103 mount 113 is geometrically similar to the second congruent end 132 of the post structure 111. The vessel 103 mount 113 is sized such that the post structure 111 inserts into the vessel 103 mount 113. The second congruent end 132 inserts into the vessel 103 mount 113 such that the center axis of the post structure 111 aligns with the tubular structure of the vessel 103 mount 113. The vessel 103 mount 113 forms the structure of the stanchion structure 101 that secures the stanchion structure 101 to the vessel 103.

The vessel 103 mount 113 forms an electric connection with the electrical system of the vessel 103. The vessel 103 mount receives electric energy from the vessel 103. The vessel 103 mount 113 forms an electric connection with the electrical system of the lamp circuit 102. The vessel 103 mount 113 transmits the received electric energy to the lamp circuit 102.

The lamp circuit 102 is an electric circuit. The lamp circuit 102 is a lamp. The lamp circuit 102 converts electric energy into electromagnetic radiation. The lamp circuit 102 generates visible light that radiates into the environment. The lamp circuit 102 mounts on the stanchion structure 101 such that the visible light radiates from the vessel 103 in all directions. The lamp circuit 102 is an independently powered electric circuit. By independently powered is meant that the lamp circuit 102 can operate without an electrical connection to an external power source 144. The lamp circuit 102 comprises a dome lamp sub-circuit 121, a post lamp sub-circuit 122, a control switch 123, and a power circuit 124. The dome lamp sub-circuit 121, the post lamp sub-circuit 122, the control switch 123, and the power circuit 124 are electrically interconnected.

The dome lamp sub-circuit 121 is an electric circuit. The dome lamp sub-circuit 121 is an electric sub-circuit of the lamp circuit 102. The dome lamp sub-circuit 121 converts electric energy into visible light. The dome lamp sub-circuit 121 is the sub-circuit of the lamp circuit 102 that mounts in the dome disk 112 of the stanchion structure 101. The dome disk 112 contains the dome lamp sub-circuit 121 of the lamp circuit 102 such that the visible light generated by the dome lamp sub-circuit 121 radiates out of the transparent structure of the post structure 111 into the environment. The dome lamp sub-circuit 121 electrically connects to the power circuit 124. The dome lamp sub-circuit 121 draws electric energy from the power circuit 124.

The post lamp sub-circuit 122 is an electric circuit. The post lamp sub-circuit 122 is an electric sub-circuit of the lamp circuit 102. The post lamp sub-circuit 122 converts electric energy into visible light. The post lamp sub-circuit 122 is formed from an LED rope. The post lamp sub-circuit 122 is the sub-circuit of the lamp circuit 102 that wraps around the lateral face structure 133 of the stanchion structure 101. The post lamp sub-circuit 122 wraps around the lateral face structure 133 such that the visible light generated by the post lamp sub-circuit 122 radiates radially away from the lateral face structure 133 into the environment. The post lamp sub-circuit 122 electrically connects to the power circuit 124. The post lamp sub-circuit 122 draws electric energy from the power circuit 124.

The control switch 123 is an electric switch. The control switch 123 is a maintained switch. The control switch 123 forms an electric connection between the power circuit 124 and the dome lamp sub-circuit 121. The control switch 123 forms an electric connection between the power circuit 124 and the post lamp sub-circuit 122. The control switch 123 controls the flow of electricity between the power circuit 124 into the dome lamp sub-circuit 121. The control switch 123 controls the flow of electricity between the power circuit 124 into the dome lamp sub-circuit 121.

The control switch 123 actuates between a closed position and an open position. In the closed position, the control switch 123 enables the flow of electric energy into the dome lamp sub-circuit 121 and the post lamp sub-circuit 122 such that the dome lamp sub-circuit 121 and the post lamp sub-circuit 122 are simultaneously illuminated. In the open position, the control switch 123 disables the flow of electric energy into the dome lamp sub-circuit 121 and the post lamp sub-circuit 122 such that the dome lamp sub-circuit 121 and the post lamp sub-circuit 122 are simultaneously extinguished.

The power circuit 124 is an electrical circuit. The power circuit 124 powers the operation of the lamp circuit 102. The power circuit 124 is an electrochemical device. The power circuit 124 converts chemical potential energy into the electrical energy required to power the lamp circuit 102. The power circuit 124 comprises a battery 141, a diode 142, a charging port 143, and an external power source 144. The external power source 144 further comprises a charging plug 145. The battery 141 further comprises a first positive terminal 151.

The external power source 144 further comprises a second positive terminal 152. The battery 141, the diode 142, the charging port 143, the external power source 144, and the charging plug 145 are electrically interconnected. In the first potential embodiments of the disclosure, the external power source 144 is the electric system of vessel.

The battery 141 is an electrochemical device. The battery 141 converts chemical potential energy into the electrical energy used to power the lamp circuit 102. The battery 141 is a commercially available rechargeable battery 141. The chemical energy stored within the rechargeable battery 141 is renewed and restored through use of the charging port 143. The charging port 143 is an electrical circuit that reverses the polarity of the rechargeable battery 141 and provides the energy necessary to reverse the chemical processes that the rechargeable battery 141 initially used to generate the electrical energy. This reversal of the chemical process creates a chemical potential energy that will later be used by the rechargeable battery 141 to generate electricity.

The charging port 143 forms an electrical connection to an external power source 144 using a charging plug 145. The charging plug 145 forms a detachable electrical connection with the charging port 143. The charging port 143 receives electrical energy from the external power source 144 through the charging plug 145. The diode 142 is an electrical device that allows current to flow in only one direction. The diode 142 installs between the rechargeable battery 141 and the charging port 143 such that electricity will not flow from the first positive terminal 151 of the rechargeable battery 141 into the second positive terminal 152 of the external power source 144.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Battery: As used in this disclosure, a battery is a chemical device consisting of one or more cells, in which chemical energy is converted into electricity and used as a source of power. Batteries are commonly defined with a positive terminal and a negative terminal.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electromagnetic Radiation: As used in this disclosure, electromagnetic radiation refers to an interaction between electric fields and magnetic fields that is capable of transmitting energy through a vacuum.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lamp: As used in this disclosure, a lamp is an electrical circuit that generates (typically visible spectrum) electromagnetic radiation.

LED: As used in this disclosure, an LED is an acronym for a light emitting diode. A light emitting diode is a diode that is also a light source.

LED Rope: As used in this disclosure, an LED rope is a lighting device. The LED rope uses LEDs to illuminate a space. The LED rope is a flexible cord structure. The illuminating LEDs are distributed along the span of the length of the cord. The LED rope mounts on a surface. The flexible nature of the LED rope allows the LED rope to bend around corners during installation. The LED rope draws power from the national electric grid. While there are minor technical differences, this definition is intended to include LED rope like products commonly marketed as LED strips.

Light: As used in this disclosure, light refers to electromagnetic radiation that illuminates an area. Illumination is a synonym for light, particularly in cases where a measure of the amount of light in a space is called for.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Stanchion: As used in this disclosure, a stanchion refers to a vertically oriented prism-shaped pole, post, or support.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vessel: As used in this disclosure, a vessel is a type of vehicle. A vessel transports passengers, goods, or equipment over water.

Visible Light: As used in this disclosure, visible light refers electromagnetic radiation with a wavelength in the approximate range of 400 nanometers to 800 nanometers.

Wind: As used in this disclosure, to wind refers to making a rotational movement that used to: a) load a cord on the lateral face of a prism; or, b) to tighten a torsion spring.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An enhanced boat anchor light comprising
a stanchion structure and a lamp circuit;
wherein the lamp circuit mounts on the stanchion structure;
wherein the lamp circuit comprises a dome lamp sub-circuit, a post lamp sub-circuit, a control switch, and a power circuit;
wherein the dome lamp sub-circuit, the post lamp sub-circuit, the control switch, and the power circuit are electrically interconnected;
wherein the post lamp sub-circuit is formed from an LED rope;
wherein the post lamp sub-circuit is the sub-circuit of the lamp circuit that wraps around a lateral face structure of the stanchion structure;
wherein the post lamp sub-circuit wraps around the lateral face structure such that the visible light generated by the post lamp sub-circuit radiates radially away from the lateral face structure into an environment;
wherein the post lamp sub-circuit electrically connects to the power circuit;
wherein the post lamp sub-circuit draws electric energy from the power circuit.

2. The enhanced boat anchor light according to claim 1
wherein the enhanced boat anchor light is a signaling device;
wherein the enhanced boat anchor light is a safety device;
wherein the enhanced boat anchor light is configured for use with a vessel;
wherein the enhanced boat anchor light is illuminated during darkness such that the vessel can be seen on the water.

3. The enhanced boat anchor light according to claim 2
wherein the lamp circuit generates the illumination of the enhanced boat anchor light;
wherein the stanchion structure elevates the generated illumination above the surface of the water.

4. The enhanced boat anchor light according to claim 3
wherein the stanchion structure is a rigid structure;
wherein the stanchion structure is a load bearing structure;
wherein the stanchion structure is a prism shaped structure;
wherein the stanchion structure attaches to the vessel such that the center axis of the stanchion structure is vertically aligned;
wherein the stanchion structure transfers the load of the lamp circuit to the vessel;
wherein the lamp circuit mounts on the stanchion structure such that the illumination generated by the lamp circuit is visible from the an environment;
wherein the stanchion structure elevates the lamp circuit above the surface of the water.

5. The enhanced boat anchor light according to claim 4
wherein the lamp circuit is an electric circuit;
wherein the lamp circuit is a lamp;
wherein the lamp circuit converts electric energy into electromagnetic radiation;
wherein the lamp circuit generates visible light that radiates into the environment;
wherein the lamp circuit mounts on the stanchion structure such that the visible light radiates from the vessel in all directions;
wherein the lamp circuit is an independently powered electric circuit;
wherein by independently powered is meant that the lamp circuit can operate without an electrical connection to an external power source.

6. The enhanced boat anchor light according to claim 5
wherein the stanchion structure comprises a post structure, a dome disk, and a vessel mount;
wherein the dome disk and the vessel mount attach to the post structure.

7. The enhanced boat anchor light according to claim 6
wherein the post structure forms the primary structure of the stanchion structure;
wherein the post structure forms the primary shape of the stanchion structure;
wherein the post structure is a rigid structure;
wherein the post structure is a prism shaped structure;
wherein the post structure is a load bearing structure;
wherein a portion of the lamp circuit attaches to the exterior surface of the post structure;
wherein the post structure transfers the loads of the lamp circuit, the dome disk, and the vessel mount to the vessel;
wherein the post structure elevates the lamp circuit and the dome disk above the surface of the water.

8. The enhanced boat anchor light according to claim 7
wherein the post structure further comprises a first congruent end, a second congruent end, and the a lateral face structure;
wherein the first congruent end is a congruent end of the prism structure of the post structure;
wherein the first congruent end is the superior structure of the post structure;
wherein the first congruent end is the congruent end of the post structure that is distal from the surface of the water;
wherein the second congruent end is a congruent end of the prism structure of the post structure;
wherein the second congruent end is the inferior structure of the post structure;
wherein the second congruent end is the congruent end of the post structure that is distal from the first congruent end;
wherein the lateral face structure forms the lateral face of the prism structure of the post structure.

9. The enhanced boat anchor light according to claim 8
wherein the dome disk is a disk shaped structure;
wherein the dome disk is a partially transparent structure;
wherein the dome disk is a hollow structure;
wherein the dome disk attaches to the first congruent end of the post structure to form a congruent prism structure;
wherein the dome disk forms a housing that contains the balance of the lamp circuit.

10. The enhanced boat anchor light according to claim 9
wherein the vessel mount is a roughly tubular structure;
wherein the vessel mount is geometrically similar to the second congruent end of the post structure;
wherein the vessel mount is sized such that the post structure inserts into the vessel mount;
wherein the second congruent end inserts into the vessel mount such that the center axis of the post structure aligns with the tubular structure of the vessel mount;
wherein the vessel mount forms the structure of the stanchion structure that secures the stanchion structure to the vessel;
wherein the vessel mount forms an electric connection with the electrical system of the vessel;
wherein the vessel mount receives electric energy from the vessel;
wherein the vessel mount forms an electric connection with the electrical system of the lamp circuit;
wherein the vessel mount transmits the received electric energy to the lamp circuit.

11. The enhanced boat anchor light according to claim 10
wherein the dome lamp sub-circuit is an electric circuit;
wherein the dome lamp sub-circuit is an electric sub-circuit of the lamp circuit;
wherein the dome lamp sub-circuit converts electric energy into visible light;
wherein the dome lamp sub-circuit is the sub-circuit of the lamp circuit that mounts in the dome disk of the stanchion structure;
wherein the dome disk contains the dome lamp sub-circuit of the lamp circuit such that the visible light generated by the dome lamp sub-circuit radiates out of the transparent structure of the post structure into the environment;
wherein the dome lamp sub-circuit electrically connects to the power circuit;
wherein the dome lamp sub-circuit draws electric energy from the power circuit.

12. The enhanced boat anchor light according to claim 11
wherein the post lamp sub-circuit is an electric circuit;
wherein the post lamp sub-circuit is an electric sub-circuit of the lamp circuit;
wherein the post lamp sub-circuit converts electric energy into visible light.

13. The enhanced boat anchor light according to claim 12
wherein the control switch is an electric switch;
wherein the control switch is a maintained switch;
wherein the control switch forms an electric connection between the power circuit and the dome lamp sub-circuit;
wherein the control switch forms an electric connection between the power circuit and the post lamp sub-circuit;
wherein the control switch controls the flow of electricity between the power circuit into the dome lamp sub-circuit;
wherein the control switch controls the flow of electricity between the power circuit into the dome lamp sub-circuit;
wherein the control switch actuates between a closed position and an open position;
wherein in the closed position, the control switch enables the flow of electric energy into the dome lamp sub-circuit and the post lamp sub-circuit such that the dome lamp sub-circuit and the post lamp sub-circuit are simultaneously illuminated;
wherein in the open position, the control switch disables the flow of electric energy into the dome lamp sub-circuit and the post lamp sub-circuit such that the dome lamp sub-circuit and the post lamp sub-circuit are simultaneously extinguished.

14. The enhanced boat anchor light according to claim 13
wherein the power circuit is an electrical circuit;
wherein the power circuit powers the operation of the lamp circuit;
wherein the power circuit is an electrochemical device;
wherein the power circuit converts chemical potential energy into the electrical energy required to power the lamp circuit.

15. The enhanced boat anchor light according to claim 14
wherein the power circuit comprises a battery, a diode, a charging port, and an external power source;
wherein the external power source further comprises a charging plug;
wherein the battery further comprises a first positive terminal;
wherein the external power source further comprises a second positive terminal;
wherein the battery, the diode, the charging port, the external power source, and the charging plug are electrically interconnected.

\* \* \* \* \*